US012138822B2

(12) United States Patent
Lou et al.

(10) Patent No.: US 12,138,822 B2
(45) Date of Patent: Nov. 12, 2024

(54) METHOD AND DEVICE FOR PREPARING MAGNETIC BAMBOO WOOD

(71) Applicant: NANJING FORESTRY UNIVERSITY, Nanjing (CN)

(72) Inventors: Zhichao Lou, Nanjing (CN); He Han, Nanjing (CN); Yanjun Li, Nanjing (CN); Daihao Song, Nanjing (CN); Wenhui Yang, Nanjing (CN)

(73) Assignee: NANJING FORESTRY UNIVERSITY, Nanjing (CN)

( * ) Notice: Subject to any disclaimer, the term of this patent is extended or adjusted under 35 U.S.C. 154(b) by 0 days.

(21) Appl. No.: 18/644,432

(22) Filed: Apr. 24, 2024

(65) Prior Publication Data

US 2024/0278454 A1 Aug. 22, 2024

(30) Foreign Application Priority Data

Oct. 26, 2023 (CN) ........................ 202311401229.1

(51) Int. Cl.

*B27K 3/26* (2006.01)
*B27K 3/02* (2006.01)
*B27K 3/32* (2006.01)
*B27K 5/00* (2006.01)

(52) U.S. Cl.

CPC .......... *B27K 3/0285* (2013.01); *B27K 3/0214* (2013.01); *B27K 3/26* (2013.01); *B27K 3/32* (2013.01); *B27K 5/001* (2013.01)

(58) Field of Classification Search

None

See application file for complete search history.

(56) References Cited

U.S. PATENT DOCUMENTS

| | | | |
|---|---|---|---|
| 2007/0020476 | A1 | 1/2007 | Kintzley et al. |
| 2010/0015194 | A1 | 1/2010 | Donath et al. |
| 2011/0262727 | A1 | 10/2011 | Tu et al. |

OTHER PUBLICATIONS

CNIPA, Notification to grant patent right for Chinese application 202311401229.1, Jan. 4, 2024.

*Primary Examiner* — David P Turocy

(74) *Attorney, Agent, or Firm* — Hemisphere Law, PLLC; Zhigang Ma

(57) ABSTRACT

The present disclosure relates to the technical field of wood preparation, and in particular, to a method and device for preparing a magnetic bamboo wood. A technical problem to be solved in the present disclosure is that: Lignin in a wood will affect the soaking efficiency of the wood during soaking of the wood. In the present disclosure, sodium hydroxide and sodium sulfite in a ratio of 2:1 are put into the soaking bucket in sequence through the high-precision powder weighing equipment and are fully dissolved in distilled water to obtain a solution, so that the solution reacts with the lignin in the bamboo wood to elute the lignin, which increases the porosity of the bamboo wood, improves the soaking efficiency, and improves the magnetism of the bamboo wood.

7 Claims, 10 Drawing Sheets

METHOD AND DEVICE FOR PREPARING MAGNETIC BAMBOO WOOD

TECHNICAL FIELD

The present disclosure relates to the technical field of wood preparation, and in particular, to a method and device for preparing a magnetic bamboo wood.

BACKGROUND

Bamboo woods are materials commonly used in people's daily life, and play an indispensable role in furniture production, home decoration, construction, and other aspects. With the progress of science and technology, wireless electronic devices such as mobile phones and routers are gradually widely used in people's life. Electromagnetic waves generated by these electronic devices also have a certain impact on health of people. After research by scientific research staff, a new type of magnetized wood-based functional material necessary and suitable for human living has been successfully developed, which endows a wood with magnetic and electromagnetic shielding functions.

At present, during preparation of a magnetic wood, a wood is usually sawn into wooden blocks, and shaken and washed in an ultrasonic cleaning machine. After being dried, the wooden blocks are soaked in a ferric salt solution, incubated with inert gas, flushed and dried, and finally hydrolyzed and washed to obtain a magnetic wood. However, lignin in the wood endows the wood with corrosion resistance. The lignin can strengthen the structure of the wood, but during the soaking, the soaking efficiency of the wood is easily affected. Therefore, the process of preparing a magnetic wood can be improved to improve the soaking efficiency of the magnetic wood.

SUMMARY

In order to overcome the shortcoming that lignin in a wood will affect the soaking efficiency of the wood during soaking of the wood, the present disclosure aims to provide a method and device for preparing a magnetic bamboo wood, which improves the magnetism of the bamboo wood.

Technical Solutions of the Present Disclosure are as Follows:

A device for preparing a magnetic bamboo wood includes a base, a soaking bucket, and a bracket; the base is connected to the soaking bucket and the bracket; the device further includes a lower hot pressing plate, high-precision powder weighing equipment, a water outlet, a water adding assembly, a clamping mechanism, an air drying mechanism, a heating mechanism, a hot pressing mechanism, and a driving mechanism; the water outlet is arranged on a lower part of the soaking bucket; the bracket is fixedly connected to the lower hot pressing plate configured to place a bamboo wood; the driving mechanism is arranged on the bracket; the driving mechanism includes an electric drive pusher I; the clamping mechanism is arranged on a telescopic rod of the electric drive pusher I; the clamping mechanism is configured to clamp the bamboo wood on the lower hot pressing plate into the soaking bucket; the high-precision powder weighing equipment is mounted on the soaking bucket; the high-precision powder weighing equipment is configured to accurately feed chemical reagents into the soaking bucket; the water adding assembly is arranged on the base the air drying mechanism and the heating mechanism are arranged in the soaking bucket the hot pressing mechanism is arranged on the bracket; a solution is added into the soaking bucket through the water adding assembly; by cooperation with the chemical reagents fed through the high-precision powder weighing equipment, lignin in the bamboo wood is eluted, and the bamboo wood is soaked; and after the bamboo wood is dried by the air drying mechanism and the heating mechanism, the hot pressing mechanism is configured to perform hot pressing on the bamboo wood to increase the density of the bamboo wood.

As a preferable technical solution of the present disclosure, the clamping mechanism includes a connecting assembly, a lifting plate, clamping plates, springs I, wedge blocks I, springs II, pulling ropes, and a rotating motor; the telescopic rod of the electric drive pusher I is fixedly connected to the connecting assembly; the connecting assembly is slidably connected to the lifting plate; one side of the connecting assembly is fixedly connected to the rotating motor; the rotating motor is fixedly connected to the lifting plate through a rotating shaft and the connecting assembly; the springs II are mounted between the connecting assembly and the lifting plates; the clamping plates are slidably connected into the lifting plate; the springs I are connected between the lifting plate and the clamping plates; the wedge blocks I matched with the clamping plates are arranged in the lifting plate; and the pulling ropes are connected between the connecting assembly and the wedge blocks I.

As a preferable technical solution of the present disclosure, the air drying mechanism includes a fan and an air outlet pipe; the fan is mounted on the soaking bucket; the fan is connected to the air outlet pipe; and the air outlet pipe is communicated to the soaking bucket.

As a preferable technical solution of the present disclosure, the heating mechanism includes a heater and a heating pipe; the heater is mounted at a lower part of the soaking bucket; the heating pipe is mounted on the heater; and the heating pipe is located at an inner lower part of the soaking bucket.

As a preferable technical solution of the present disclosure, the hot pressing mechanism includes a hydraulic cylinder, a microwave element, an upper hot pressing plate, and a limiting assembly; the hydraulic cylinder is mounted on the bracket; the microwave element is fixedly connected to a piston rod of the hydraulic cylinder; the microwave element is fixedly connected to the upper hot pressing plate; and the limiting assembly is arranged on the lower hot pressing plate to restrict the movement of the bamboo wood during hot pressing performed on the bamboo wood.

As a preferable technical solution of the present disclosure, the limiting assembly includes limiting plates, springs III, inclined blocks, an electric drive pusher II, a wedge block II, and lifting blocks; the lower hot pressing plate is symmetrically slidably connected to the limiting plates; the springs III are connected between the limiting plates and the lower hot pressing plate; the upper hot pressing plate is symmetrically fixedly connected to the inclined blocks matched with the limiting plates; sliding slots are symmetrically formed in one side of the lower hot pressing plate; the lifting blocks are slidably connected into the sliding slots; top ends of the lifting blocks are fixedly connected to the electric drive pusher II and the wedge block II; elastic members are arranged at bottom ends of the lifting blocks; and the elastic members are fixedly connected to a bottom end of the lower hot pressing plate through a supporting plate.

As a preferable technical solution of the present disclosure, the device for preparing the magnetic bamboo wood further includes a driving motor and a stirring rod; the driving motor is mounted at the lower part of the soaking bucket; and the stirring rod is fixedly connected to an output shaft of the driving motor.

As a preferable technical solution of the present disclosure, the device for preparing the magnetic bamboo wood further includes an ultrasonic cleaning machine, a vacuum machine, an electric guide rail, and a sealing plate; the ultrasonic cleaning machine is arranged on the soaking bucket; the vacuum machine is mounted on one side of the soaking bucket through an extraction pipe; the vacuum machine is fixedly connected to a top end of the base; the electric guide rail is arranged at a top end of the soaking bucket; and a top end of the electric guide rail is slidably connected to the sealing plate.

As a preferable technical solution of the present disclosure, the device for preparing the magnetic bamboo wood further includes a water outlet gate, a convex block, and a spring IV; the water outlet on the soaking bucket is slidably connected to the water outlet gate and the convex block; and the spring IV is connected between the water outlet gate and the soaking bucket.

As a preferable technical solution of the present disclosure, the present disclosure further provides a method for preparing a magnetic bamboo wood, using the device for preparing the magnetic bamboo wood mentioned above. The method includes the following steps:

- S1: pumping distilled water into the soaking bucket, and feeding sodium hydroxide and sodium sulfite in a ratio of 2:1 into the soaking bucket in sequence through the high-precision powder weighing equipment, obtaining a mixed solution after full dissolving, heating the solution to enable the solution to react with the lignin in the bamboo wood to elute the lignin;
- S2: adding hydrogen peroxide, heating the mixture, washing off residual sodium hydroxide and sodium sulfite, and then adding ethyl alcohol to wash the bamboo wood for 1 to 5 hours;
- S3: drying the bamboo wood until the moisture content is below 12%;
- S4: feeding a trivalent ferrite salt and a divalent ferrite salt into the soaking bucket, wherein the trivalent ferrite salt and the divalent ferrite salt are dissolved in the soaking bucket with deionized water for full dissolving, so that a molar concentration ratio of trivalent iron to divalent iron in the mixed solution is 2:1, and soaking the bamboo wood;
- S5: drying the bamboo wood in air;
- S6: pumping a 25% ammonia water into the soaking bucket to soak the bamboo wood in the 25% ammonia water, and drying the bamboo wood in air after the soaking of the bamboo wood ends; and
- S7: clamping the bamboo wood onto the lower hot pressing plate again, turning on the hydraulic cylinder to drive the upper hot pressing plate to move down to perform hot pressing on the bamboo wood; with the assistance of microwaves of the microwave element, turning off the hydraulic cylinder; and completing the preparation of the magnetic bamboo wood.

The Present Disclosure has the Following Advantages:

1. In the present disclosure, the sodium hydroxide and the sodium sulfite in the ratio of 2:1 are put into the soaking bucket in sequence through the high-precision powder weighing equipment and are fully dissolved in the distilled water to obtain a solution, so that the solution reacts with the lignin in the bamboo wood to elute the lignin, which increases the porosity of the bamboo wood, improves the soaking efficiency, and improves the magnetism of the bamboo wood.

2. In the present disclosure, the hydraulic cylinder drives the upper hot pressing plate to move down to perform the hot pressing on the bamboo wood; with the assistance of the microwaves of the microwave element, the bamboo wood generates magnetic particles, the volume of the bamboo wood is reduced, the density is increased, and the magnetism of the bamboo wood is improved.

3. In the present disclosure, the ultrasonic cleaning machine can clean the chemical reagents more quickly; and the bamboo wood can be quickly dried through the fan and the heater, so that the preparation requirements are quickly met, and the efficiency of preparing the magnetic bamboo wood is improved.

Figure 1:
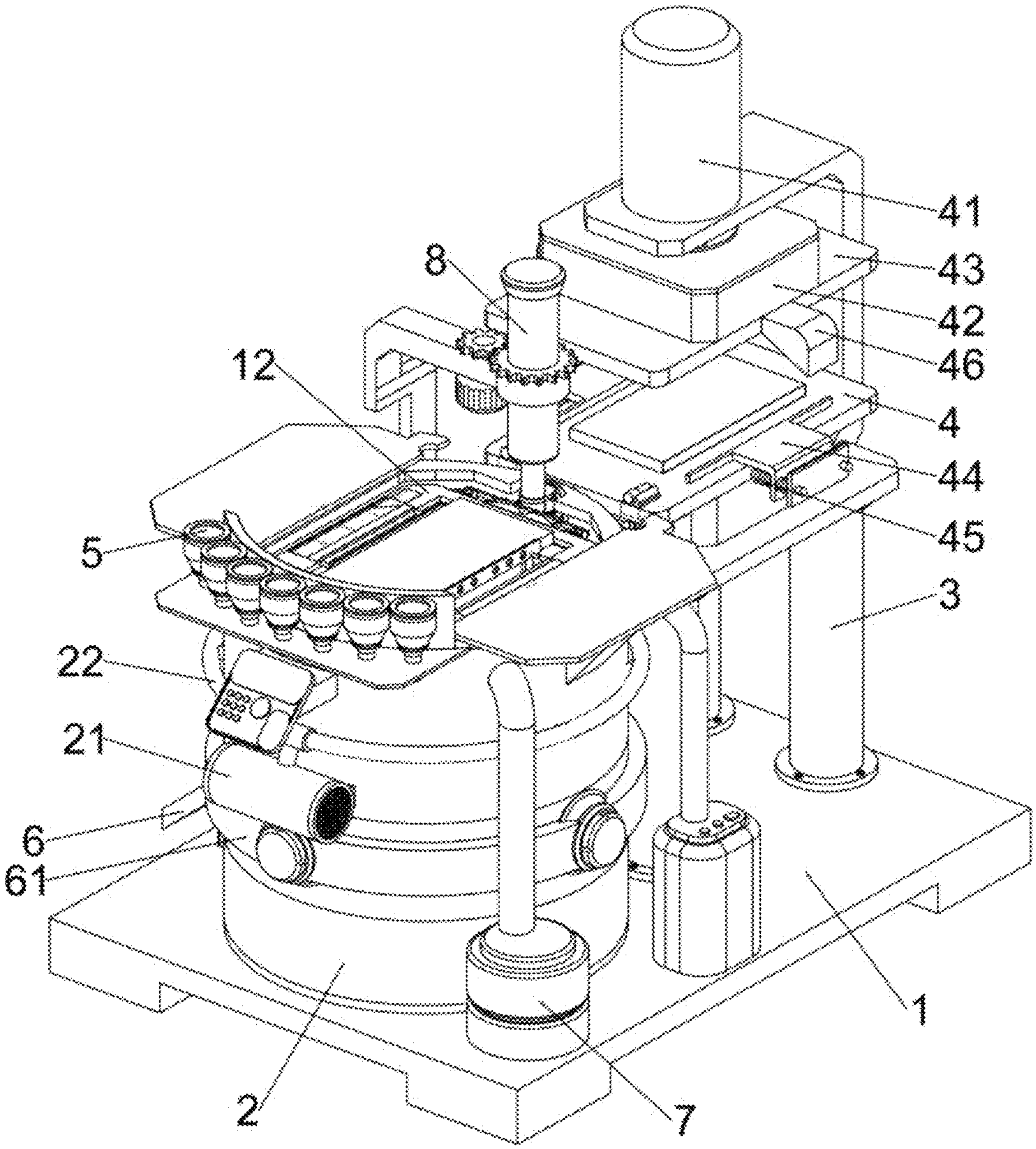
FIG. 1 is a schematic diagram of a three-dimensional structure according to the present disclosure.

1: base; 2: soaking bucket; 3: bracket; 4: lower hot pressing plate; 5: high-precision powder weighing equipment; 6: water outlet; 7: water adding assembly; 8: electric drive pusher I; 9: vacuum machine; 10: electric guide rail; 11: connecting assembly; 12: lifting plate; 13: clamping plate; 14: spring I; 15: wedge block I; 16: spring II; 17: pulling rope; 18: rotating motor; 19: sealing plate; 21: fan; 22: air outlet pipe; 31: heater; 32: heating pipe; 41: hydraulic cylinder; 42: microwave element; 43: upper hot pressing plate; 44: limiting plate; 45: spring III; 46: inclined block; 47: electric drive pusher II: 48: wedge block II; 49: lifting block; 51: driving motor; 52: stirring rod; 61: ultrasonic cleaning machine; 71: water outlet gate; 72: convex block; and 73: spring IV.

DETAILED DESCRIPTION OF THE EMBODIMENTS

The present disclosure will be described in detail below in combination with accompanying drawings and specific embodiments, but the accompanying drawings and specific embodiments will not limit the present disclosure.

Embodiments: A device for preparing a magnetic bamboo wood, as shown in FIG. 1 to FIG. 5, includes a base 1 and a bracket 3. The base 1 is fixedly connected to the bracket 3. The device further includes a soaking bucket 2, a lower hot pressing plate 4, high-precision powder weighing equipment 5, a water outlet 6, a water adding assembly 7, a clamping mechanism, an air drying mechanism, a heating mechanism, a hot pressing mechanism, and a driving mechanism. The base 1 is fixedly connected to the soaking bucket 2. A solution can be added into the soaking bucket 2. The soaking bucket 2 is configured to elute lignin of the bamboo wood and soak the wood. The water outlet 6 is arranged at a lower part of the soaking bucket 2. After the reaction ends, waste liquid generated by the reaction can be discharged from the water outlet 6. The bracket 3 is fixedly connected to the lower hot pressing plate 4 configured to place the bamboo wood. The hot pressing plate 4 can generate heat after being electrified. The driving mechanism is arranged on the bracket 3. The driving mechanism includes an electric drive pusher I 8, a motor, and a gear set. The bracket 3 is rotatably connected to the electric drive pusher I 8. The motor is mounted on the bracket 3. Gears are arranged on an output shaft of the motor and the electric drive pusher I 8. The motor drives the electric drive pusher I 8 to rotate through the gears. The clamping mechanism is arranged on a telescopic rod of the electric drive pusher I 8. The clamping mechanism is configured to clamp the bamboo wood on the lower hot pressing plate 4 into the soaking bucket 2. The high-precision powder weighing equipment 5 is mounted on the soaking bucket 2. The high-precision powder weighing equipment 5 is a device that can precisely dispense chemical agents. Before the reaction, required chemical agents are placed into the high-precision powder weighing equipment 5. The high-precision powder weighing equipment 5 is configured to feed the chemical agents with a precise dosage into the soaking bucket 2. The water adding assembly 7 is arranged on the base 1. The water adding assembly 7 includes a water pump and a water pipe. The water pump is mounted on the base 1. The water pipe is communicated between the water pump and the soaking bucket 2. The water pump is configured to pump a solution required by the reaction into the soaking bucket 2. The air drying mechanism and the heating mechanism are arranged in the soaking bucket 2. The hot pressing mechanism is arranged on the bracket 3. The solution is added into the soaking bucket 2 through the water adding assembly 7. By cooperation with the chemical reagents fed by the high-precision powder weighing equipment 5, the lignin in the bamboo wood is eluted, and the bamboo wood is soaked. After the bamboo wood is dried via the air drying mechanism and the heating mechanism, the hot pressing mechanism is configured to perform hot pressing on the bamboo wood to increase the density.

Figure 2:
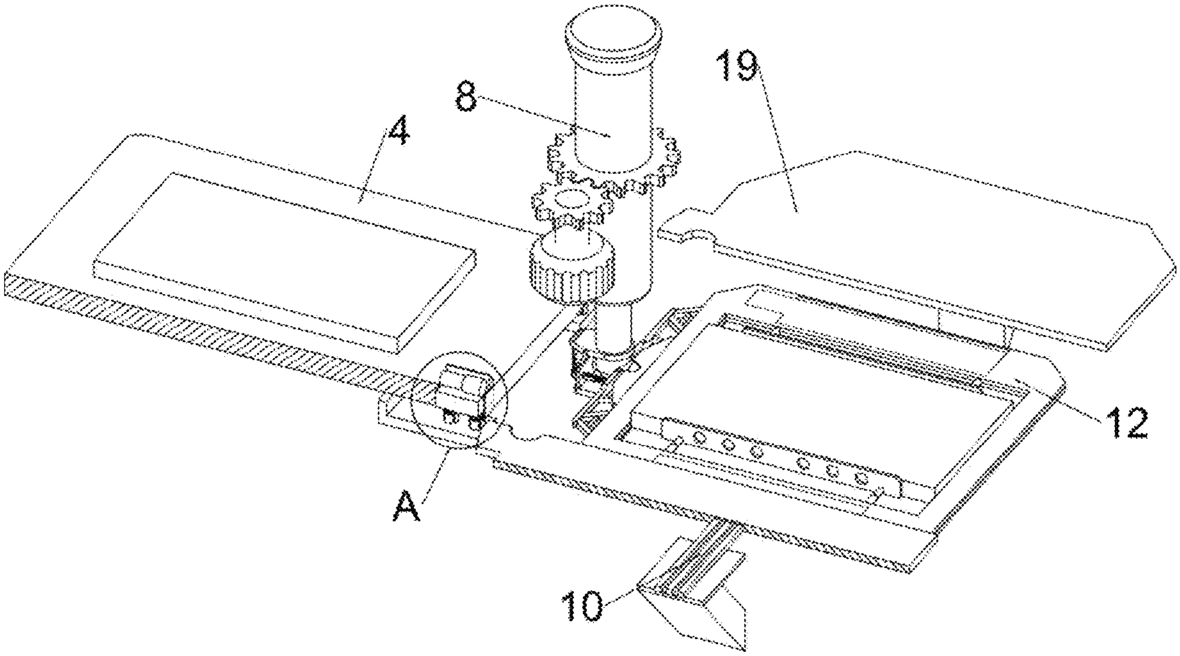
FIG. 2 is a schematic diagram of a clamping mechanism according to the present disclosure.
Figure 3:
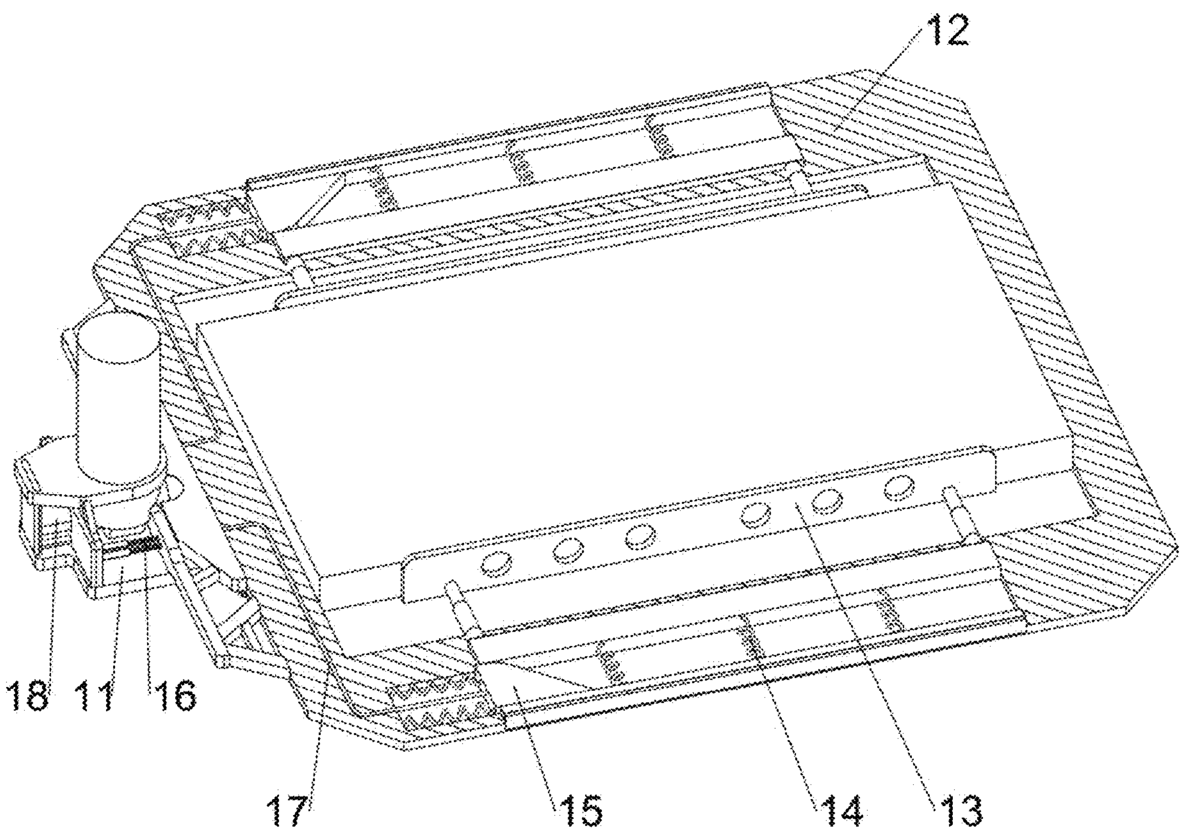
FIG. 3 is a cross-sectional view of a clamping mechanism according to the present disclosure.

As shown in FIG. 1 to FIG. 3, the clamping mechanism includes a connecting assembly 11, a lifting plate 12, clamping plates 13, springs I 14, wedge blocks I 15, springs II 16, pulling ropes 17, and a rotating motor 18. The connecting assembly 11 is fixedly connected to the telescopic rod of the electric drive pusher I 8. The electric drive pusher I 8 is driven to rotate by the motor and the gear set, thereby driving the connecting assembly 11 to rotate. The telescopic rod of the electric drive pusher I 8 drives the connecting assembly 11 to move up and down. The connecting assembly 11 is slidably connected to the lifting plate 12. The connecting assembly 11 is composed of a plurality of supporting members, and is mainly configured to support and connect the lifting plate 12. When the connecting assembly 11 moves up and down, the lifting plate 12 will be driven to move up and down. The springs II 16 are mounted between the connecting assembly 11 and the lifting plate 12. The springs II 16 are configured to control the lifting plate 12 to be reset. Front and back sides of the lifting plate 12 are slidably connected to the clamping plates 13, and the clamping plates 13 are configured to clamp the bamboo wood. Surfaces of clamping plates 13 are provided with a plurality of through holes. The through holes can make the bamboo wood more uniformly and comprehensively soaked to improve the soaking effect. The springs I 14 are connected between the lifting plate 12 and the clamping plates 13, and the springs I 14 are configured to reset the moved clamping plates 13. The wedge blocks I 15 that are matched with the clamping plates 13 are arranged inside the lifting plate 12. The wedge blocks I 15 are configured to lock the clamping plates 13 and prevent the clamping plates from moving. Elastic members are arranged between the wedge blocks I 15 and the lifting plate 12. The elastic members are configured to limit the movement of the wedge blocks I 15. The pulling ropes 17 are connected between the connecting assembly 11 and the wedge blocks I 15. The pulling ropes 17 are configured to limit the movement of the wedge blocks I 15. One side of the connecting assembly 11 is fixedly connected to the rotating motor 18. A surface of the rotating motor 18 is wrapped around by a waterproof shell. The rotating motor 18 is fixedly connected to the lifting plate 12 through a rotating shaft and the connecting assembly 11. When the bamboo wood is soaked in the soaking bucket 2, the rotating motor 18 drives the lifting plate 12 to rotate through the rotating shaft, and the lifting plate 12 drives the bamboo wood to rotate. The rotation of the lifting plate 12 can make the bamboo wood more uniformly and comprehensively soaked in the soaking bucket 2.

Figure 5:
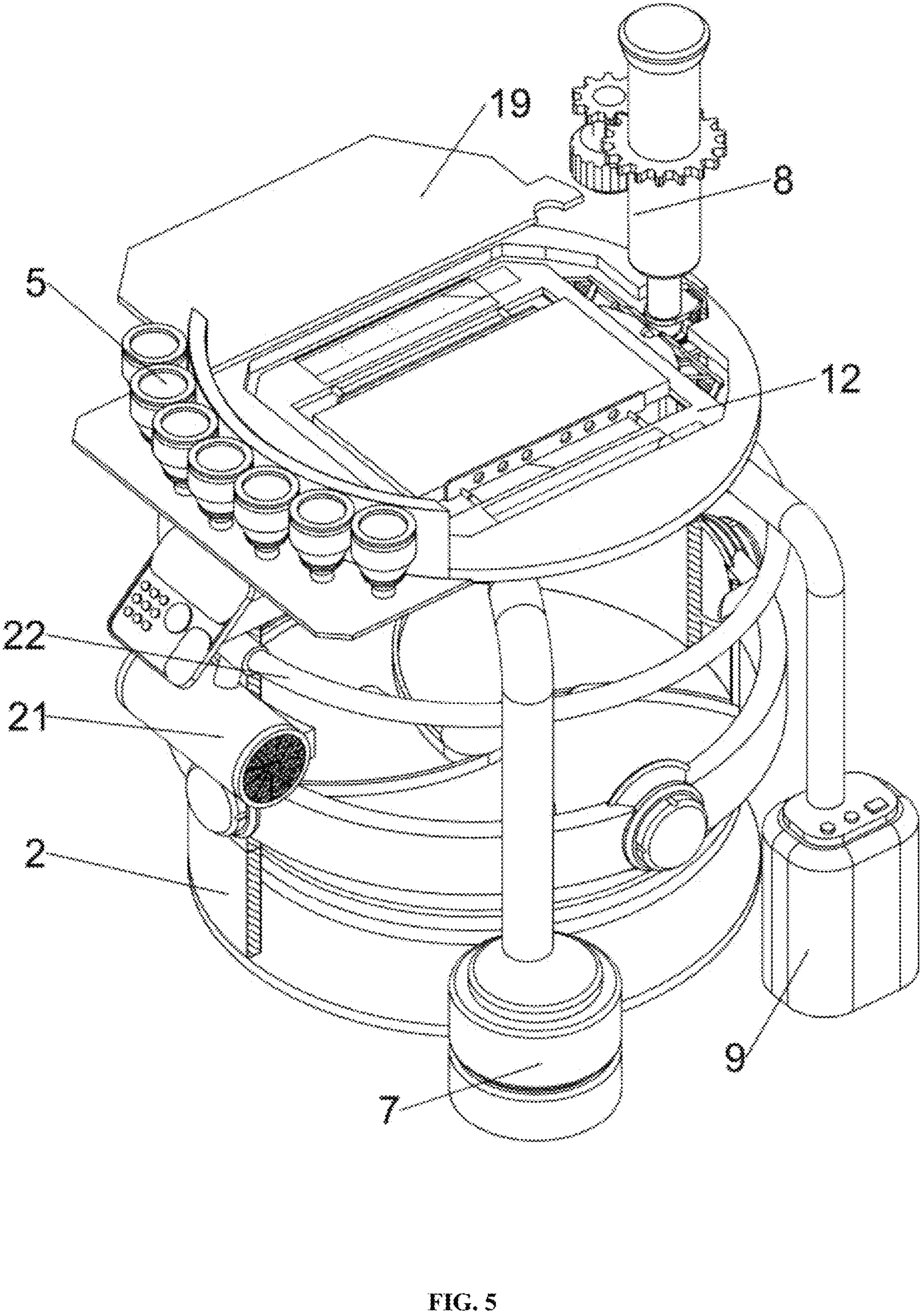
FIG. 5 is a first cross-sectional view of a soaking bucket according to the present disclosure.
Figure 6:
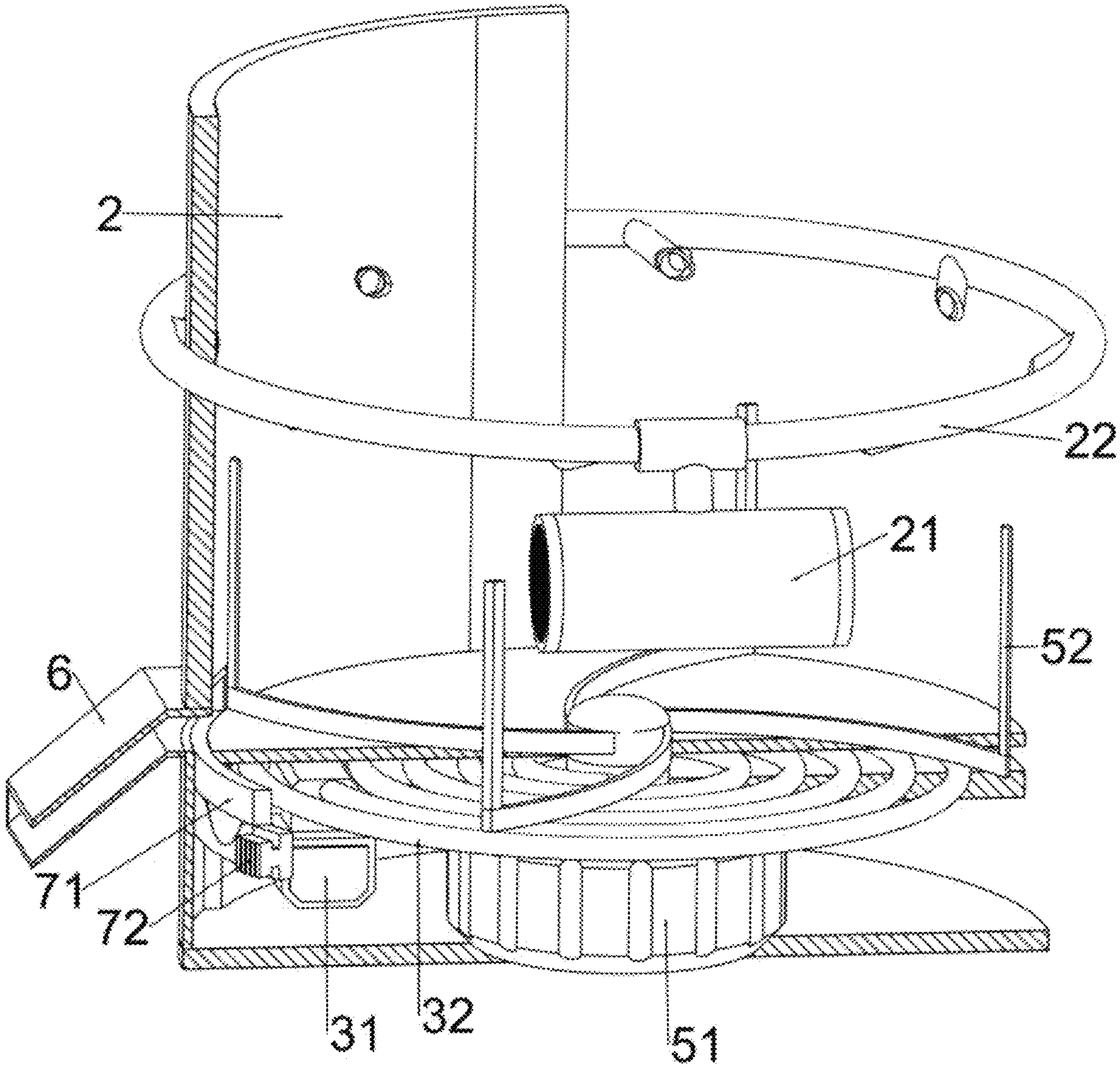
FIG. 6 is a second cross-sectional view of a soaking bucket according to the present disclosure.

As shown in FIG. 5 and FIG. 6, the air drying mechanism includes a fan 21 and an air outlet pipe 22. The fan 21 is mounted on the soaking bucket 2, and the air outlet pipe 22 is connected to the fan 21. The air outlet pipe 22 is annular. The air outlet pipe 22 surrounds and is communicated to the soaking bucket 2. When the reaction ends, the wood needs to be dried in air, the fan 21 can be turned on to generate wind power to blow the wood to dry.

As shown in FIG. 6, the heating mechanism includes a heater 31 and a heating pipe 32. The heater 31 is mounted at the lower part of the soaking bucket 2. The heating pipe 32 is mounted on the heater 31. The heating pipe 32 is located at an inner lower part of the soaking bucket 2. When a reaction solution needs to be heated, the heater can be turned on to heat the solution in the soaking bucket 2 to provide a temperature condition required for the reaction.

Figure 7:
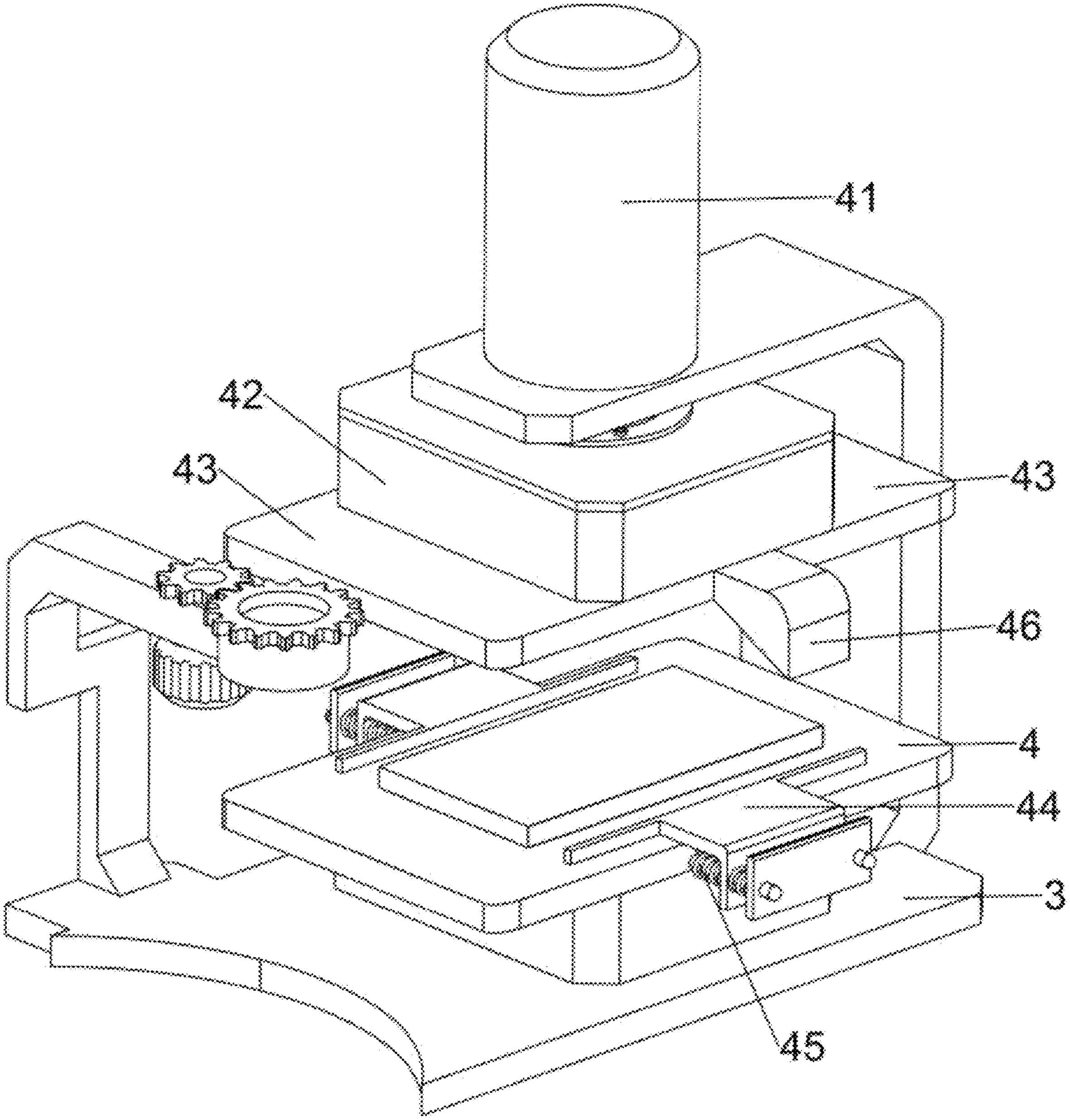
FIG. 7 is a schematic diagram of a hot pressing mechanism according to the present disclosure.

As shown in FIG. 1 and FIG. 7, the hot pressing mechanism includes a hydraulic cylinder 41, a microwave element 42, an upper hot pressing plate 43, and a limiting assembly. The hydraulic cylinder 41 is mounted on the bracket 3, and the microwave element 42 is fixedly connected to a piston rod of the hydraulic cylinder 41. The microwave element 42 is fixedly connected to the upper hot pressing plate 43. The hydraulic cylinder 41 is configured to drive the microwave element 42 and the upper hot pressing plate 43 to move down. The microwave element 42 is configured to generate microwaves to enable the wood to generate magnetic particles. Through the hot pressing of the lower hot pressing plate 4, the volume of the bamboo wood is reduced, the density is increased, and the magnetism is improved. The lower hot pressing plate 4 is provided with the limiting assembly to restrict the movement of the bamboo wood during the hot pressing performed on the bamboo wood.

Figure 4:
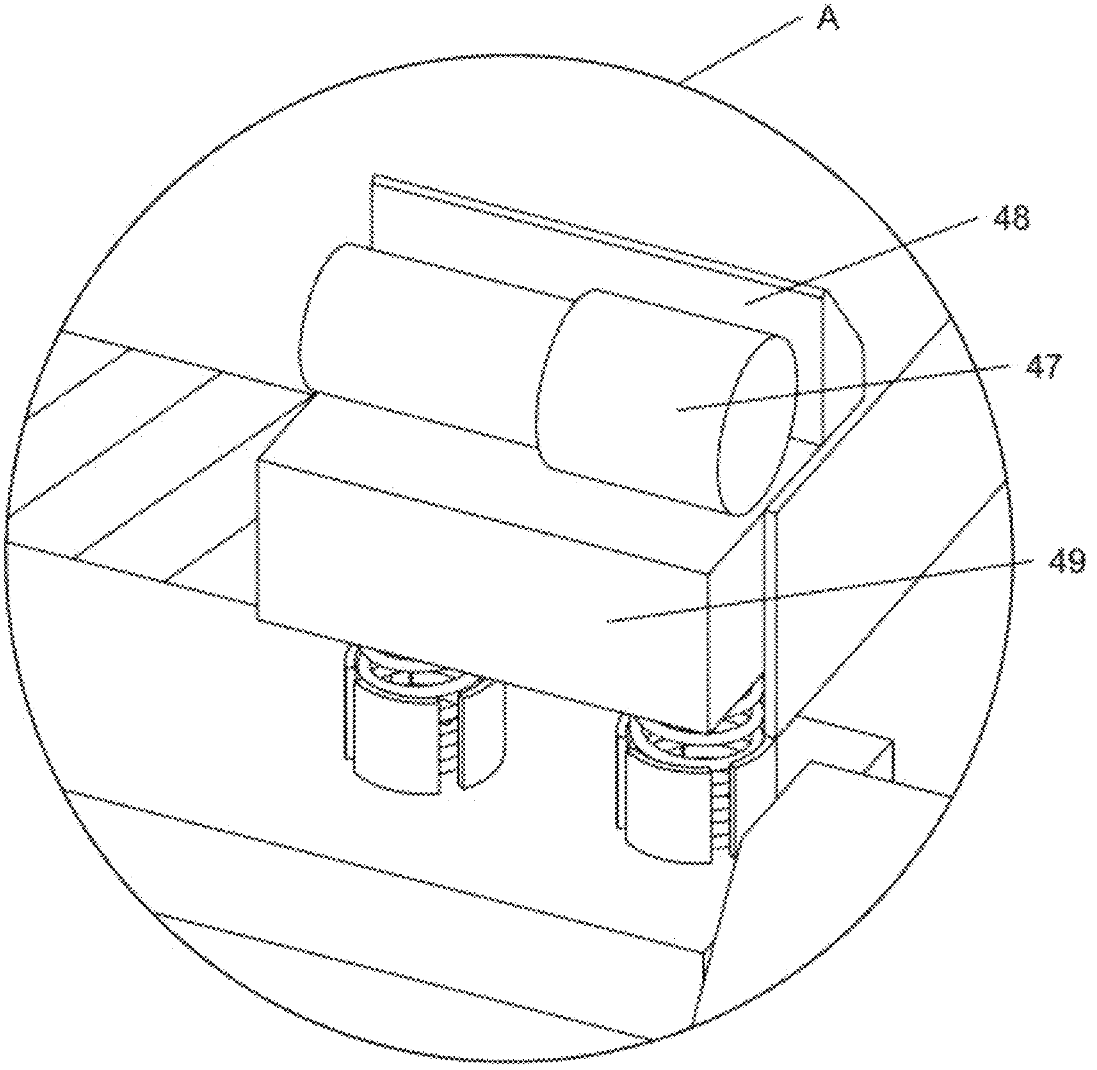
FIG. 4 is an enlarged view of A according to the present disclosure.

As shown in FIG. 1, FIG. 4, and FIG. 7, the limiting assembly includes limiting plates 44, springs III 45, inclined blocks 46, an electric drive pusher II 47, a wedge block II 48, and lifting blocks 49; the lower hot pressing plate 4 is symmetrically slidably connected to the limiting plates 44;

the springs III 45 are connected between the limiting plates 44 and the lower hot pressing plate 4; and the upper hot pressing plate 43 is symmetrically fixedly connected to the inclined blocks 46 matched with the limiting plates 44. When the wood is placed on the lower hot pressing plate 4, at the beginning, the inclined block 46 is in no contact with the bamboo wood. When the upper hot pressing plate 43 moves down to perform the hot pressing on the bamboo wood, the down movement of the hot pressing plate 43 will drive the inclined blocks 46 to move down. After the inclined blocks 46 move down, the limiting plates 44 will be pressed. The two limiting plates 44 will move closer to the middle to limit the bamboo wood. At this time, the springs III 45 will be stretched. When the hot pressing plate 43 moves up and drives the inclined blocks 46 to move up, the two limiting plates 44 move towards sides that are far away from each other under the action of elastic forces of the springs III 45, thereby releasing the bamboo wood. Sliding slots are symmetrically formed in one side of the lower hot pressing plate 4; the lifting blocks 49 are slidably connected into the sliding slots; top ends of the lifting blocks 49 are fixedly connected to the electric drive pusher II 47 and the wedge block II 48; elastic members are arranged at bottom ends of the lifting blocks 49; and the elastic members are fixedly connected to a bottom end of the lower hot pressing plate 4 through a supporting plate. When the electric drive pusher I 8 rotates to drive the connecting assembly 11 and the lifting plate 12 to rotate to a position above the lower hot pressing plate 4, the lifting plate 12 is in contact with and presses the wedge block II 48. The wedge block II 48 is pressed to move down to press the lifting blocks 49. After being pressed, the lifting blocks 49 drive the electric drive pusher II 47 to move down and press the elastic members. When the connecting assembly 11 and the lifting plate 12 are completely located above the lower hot pressing plate 4, the lifting plate 12 no longer presses the wedge block II 48, and the elastic members are begun to be released and drive the electric drive pusher II 47 and the wedge block II 48 to move up through the lifting blocks 49. After the movement ends, the electric drive pusher II 47 is in contact with the lifting plate 12 and can push the lifting plate 12 to move.

As shown in FIG. 6, the device further includes a driving motor 51 and a stirring rod 52. The driving motor 51 is mounted at the lower part of the soaking bucket 2, and an output shaft of the driving motor 51 is fixedly connected to the stirring rod 52. The driving motor 51 drives the stirring rod 52 to rotate, and the stirring rod 52 can stir the solution after the chemical agents are added, allowing the chemical agents to fully react. The stirring rod 52 can also scrape off crystals precipitated on an inner wall of the soaking bucket 2.

Before use, the bamboo wood that needs to be prepared is placed on the lower hot pressing plate 4, and the sodium hydroxide, the water, the sodium sulfite, the hydrogen peroxide, alcohol, the trivalent ferric salt, and the divalent ferric salt are put into the high-precision powder weighing equipment 5 for later use. At the beginning, the connecting assembly 11 and the lifting plate 12 are located above the soaking bucket 2. The wedge blocks I 15 inside the lifting plate 12 lock the clamping plates 13. Afterwards, the motor is turned on. The motor drives the electric drive pusher I 8 to rotate counterclockwise through the gears, and the electric drive pusher I 8 rotates to drive the connecting assembly 11 and the lifting plate 12 to rotate to the position above the lower hot pressing plate 4. When the lifting plate 12 rotates, the lifting plate 12 is in contact with and presses the wedge block II 48. After being pressed, the wedge block II 48 moves down to press the lifting blocks 49. After being pressed, the lifting blocks 49 drive the electric drive pusher II 47 to move down and press the elastic members. When the connecting assembly 11 and the lifting plate 12 are completely located above the lower hot pressing plate 4, the lifting plate 12 no longer presses the wedge block II 48, and the elastic members are begun to be released and drive the electric drive pusher II 47 and the wedge block II 48 to move up through the lifting blocks 49. After the movement ends, the electric drive pusher II 47 is in contact with one end of the lifting plate 12 and pushes the lifting plate 12 to move, so that the lifting plate 12 moves towards one side away from the connecting assembly 11. At this time, the spring 16 starts to be stretched. After the lifting plate 12 moves, it will drive the clamping plates 13 and the springs I 14 to move. As the wedge blocks I 15 are limited by the pulling ropes 17, the movement of the lifting plate 12 will not drive the wedge blocks I 15 to move. At this time, the springs II 16 are stretched. After moving, the clamping plates 13 are no longer locked by the wedge blocks I 15. The clamping plates 13 on the front and rear sides move towards sides that are far away from each other under the action of elastic forces of the springs I 14. When the clamping plates 13 are opened, the motor is turned off, and the electric drive pusher I 8 is turned on. The electric drive pusher I 8 drives the lifting plate 12 and the clamping plates 13 to move down, and then the electric drive pusher I 8 is turned off. At this time, the electric drive pusher II 47 contracts and no longer pushes the lifting plate 12. In this case, the springs II 16 begin to contract and drive the lifting plate 12 to move towards the connecting assembly 11. The lifting plate 12 drives the clamping plates 13 and the springs I 14 to move. After moving, the clamping plates 13 are in contact with slopes of the wedge blocks I 15, and the wedge blocks I 15 press the clamping plates 13, causing the springs I 14 to be stretched. Elastic members are arranged between the wedge blocks I 15 and the lifting plate 12. The elastic members may restrict the movement of the wedge blocks I 15. The clamping plates 13 do not push the wedge blocks I 15 to move. The pressing of the wedge blocks I 15 on the clamping plates 13 will cause the clamping plates 13 to move. The two clamping plates 13 get close to each other to clamp the bamboo wood. Then, the motor is turned on. The motor drives the electric drive pusher I 8 to rotate clockwise through the gears. The lifting plate 12 and the clamping plates 13 are driven to rotate clockwise through the electric drive pusher I 8. Finally, the lifting plate 12 and the clamping plates 13 rotate to the position above the soaking bucket 2. Afterwards, the motor is turned off. The lifting plate 12 and the clamping plates 13 are driven to fall into the soaking bucket 2 by the electric drive pusher I 8. The clamping plates 13 drive the bamboo wood to fall into the soaking bucket 2. The distilled water is pumped into the soaking bucket 2 through the water pump, and the sodium hydroxide and the sodium sulfite in the ratio of 2:1 are put into the soaking bucket 2 in sequence through the high-precision powder weighing equipment 5 for full dissolving, thus obtaining the mixed solution. The lifting plate 12 and the bamboo wood are driven by the telescopic rod of the electric drive pusher I 8 to enter the soaking bucket 2. The solution is heated by the heater 31 and the heating pipe 32 to react with the lignin in the bamboo wood, thereby eluting the lignin and increasing the porosity of the bamboo wood, which facilitates the subsequent soaking. After the lignin is eluted, hydrogen peroxide is added to heat and wash off the residual sodium hydroxide and sodium sulfite. Then, ethyl alcohol is added for washing for 1 to 5 hours. The solution in the soaking bucket 2 is completely discharged through the water outlet 6. The fan 21 is turned on to blow the bamboo wood to dry until the moisture content is below 12%. After the bamboo wood is dried, the fan 21 is turned off. The water pump is turned on to pump the solution containing ions into the soaking bucket 2. The water pump is turned off, and the high-precision powder weighing equipment 5 is turned on. The trivalent ferric salt and the divalent ferric salt are fed into the soaking bucket 2 through the high-precision powder weighing equipment 5. The high-precision powder weighing equipment 5 is turned off. The trivalent ferrite salt and the divalent ferrite salt are dissolved in the soaking bucket 2 with deionized water for full dissolving, so that a molar concentration ratio of trivalent iron to divalent iron in the mixed solution is 2:1, and the bamboo wood is soaked. After the soaking of the bamboo wood ends, the solution in the soaking bucket 2 is completely discharged through the water outlet 6. The fan 21 is turned on to blow the bamboo wood to dry. After the air drying, the water pump is turned on to pump 25% ammonia water into the soaking bucket 2. The water pump is turned off, and the bamboo wood is soaked in the 25% ammonia water. After the soaking of the bamboo wood ends, the fan 21 is turned on blow the bamboo wood to dry, and then the bamboo wood is clamped onto the lower hot pressing plate 4 again. The hydraulic cylinder 41 is turned on. The hydraulic cylinder 41 drives the upper hot pressing plate 43 to move down to perform the hot pressing on the bamboo wood; with the assistance of the microwaves of the microwave element 42, the bamboo wood generates magnetic particles, the volume of the bamboo wood is reduced, and the magnetism of the bamboo wood is improved, so that the magnetic bamboo wood is prepared. When the bamboo wood is soaked in the soaking bucket 2, the rotating motor 18 drives the lifting plate 12 to rotate through the rotating shaft. The lifting plate 12 drives the bamboo wood to rotate. The rotation of the lifting plate 12 can make the bamboo wood more uniformly and comprehensively soaked in the soaking bucket 2.

As shown in FIG. 1, FIG. 2, FIG. 8, and FIG. 9, the device further includes an ultrasonic cleaning machine 61. The soaking bucket 2 is provided with the ultrasonic cleaning machine 61, a vacuum machine 9, an electric guide rail 10, and sealing plates 19. The wood can be better cleaned through the ultrasonic cleaning machine 61. The vacuum machine 9 is mounted on one side of the soaking bucket 2 through an extraction pipe. The vacuum machine 9 is fixedly connected to a top end of the base 1. The electric guide rail 10 is arranged at a top end of the soaking bucket 2. A top end of the electric guide rail 10 is slidably connected to the sealing plates 19. After the electric drive pusher I 8 drives the lifting plate 12 and the bamboo wood to fall into the soaking bucket 2, the electric guide rail 10 is turned on and drives the sealing plates 19 to move, and the two sealing plates 19 get close to each other and are in contact with each other. After the two sealing plates 19 are in contact with each other, the soaking bucket 2 is in a sealed state. During the soaking of the bamboo wood, a large number of foams will be produced, and the foams will reduce a liquid level in the soaking bucket 2. When the liquid level is reduced, the soaking of the bamboo wood will be affected. The vacuum machine 9 is turned on. The vacuum machine 9 extracts air in the soaking barrel 2 through the extraction pipe to gradually reduce a pressure inside the soaking bucket 2. After the pressure decreases, the foams will gradually expand and be finally burst.

Figure 8:
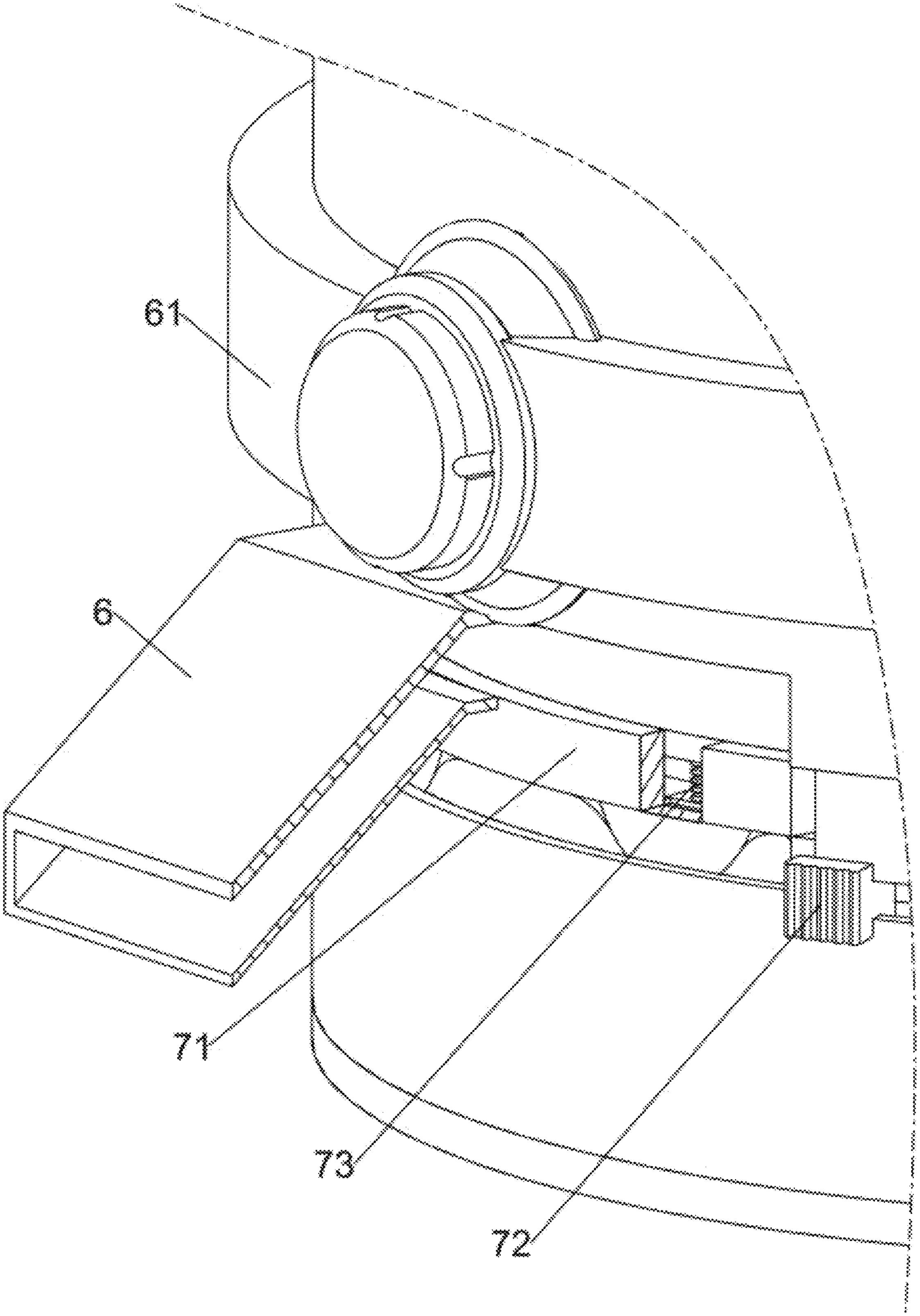
FIG. 8 is a schematic diagram of a water outlet and a water outlet gate according to the present disclosure.
Figure 9:
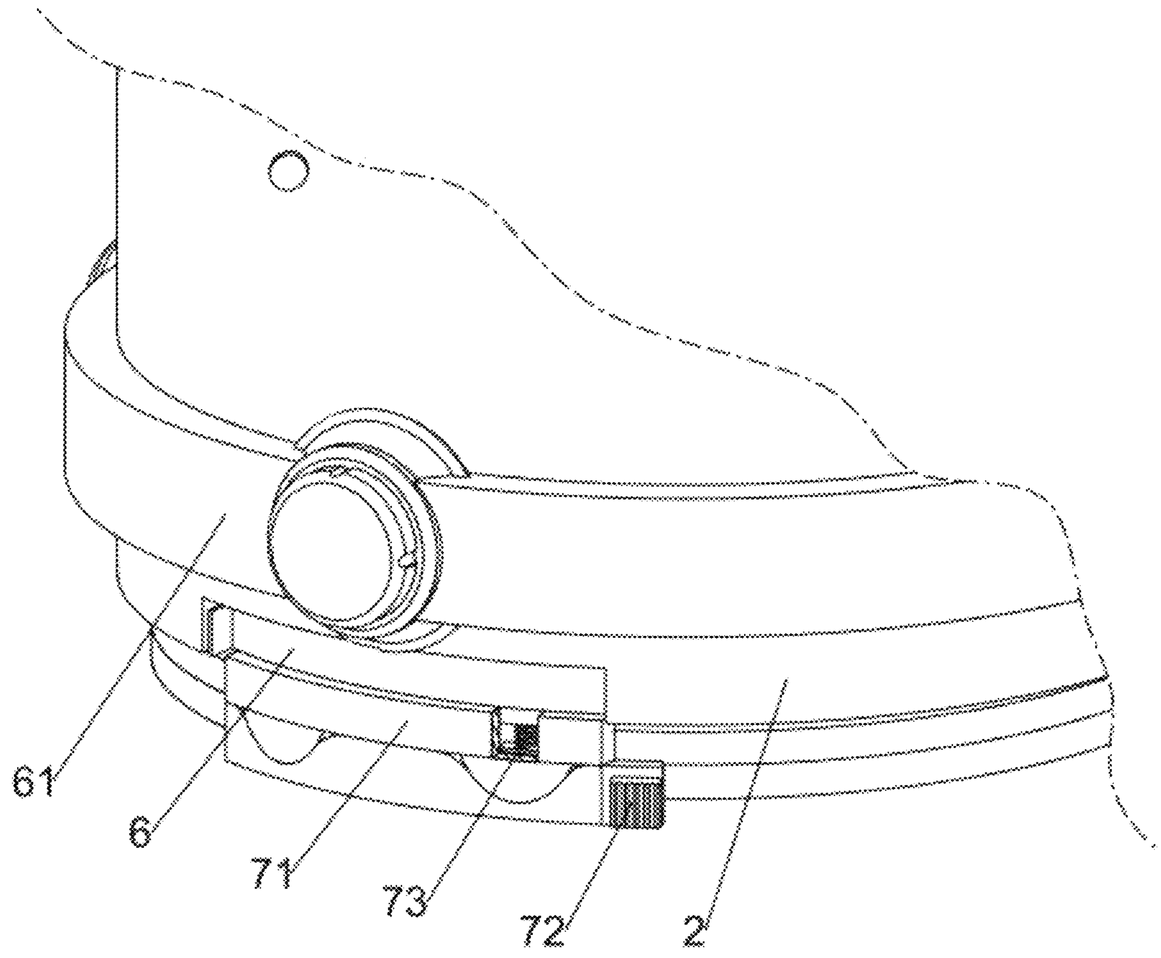
FIG. 9 is a schematic diagram of a water outlet gate and a convex block according to the present disclosure.

As shown in FIG. 1, FIG. 8, and FIG. 9, the device further includes a water outlet gate 71, a convex block 72, and a spring IV 73. The water outlet 6 on the soaking bucket 2 is slidably connected to the water outlet gate 71 and the convex block 72. The spring IV 73 is connected between the water outlet gate 71 and the soaking bucket 2. When no backflow is needed, the convex block 72 will press against the water outlet gate 71, causing the water outlet gate 71 to block the water outlet 6. When the water outlet 6 needs to be opened, the convex block 72 can be moved. The water outlet gate 71 moves down under the action of an elastic force of the spring IV 73, thereby no longer blocking the water outlet 6.

As shown in FIG. 1 to FIG. 9, the present disclosure further provides a method for preparing a magnetic bamboo wood. The method includes the following steps:

S1: pumping distilled water into the soaking bucket 2, and feeding sodium hydroxide and sodium sulfite in a ratio of 2:1 into the soaking bucket 2 in sequence through the high-precision powder weighing equipment 5, obtaining a mixed solution after full dissolving, heating the solution to enable the solution to react with the lignin in the bamboo wood to elute the lignin;

S2: adding hydrogen peroxide, heating the mixture, washing off residual sodium hydroxide and sodium sulfite, and then adding ethyl alcohol to wash the bamboo wood for 1 to 5 hours;

S3: drying the bamboo wood until the moisture content is below 12%;

S4: putting a trivalent ferrite salt and a divalent ferrite salt into the soaking bucket 2, wherein the trivalent ferrite salt and the divalent ferrite salt are dissolved in the soaking bucket 2 with deionized water for full dissolving, so that a molar concentration ratio of trivalent iron to divalent iron in the mixed solution is 2:1, and soaking the bamboo wood; S5: drying the bamboo wood in air;

S6: pumping a 25% ammonia water into the soaking bucket 2 to soak the bamboo wood in the 25% ammonia water, and drying the bamboo wood in air after the soaking of the bamboo wood ends; and S7: clamping the bamboo wood onto the lower hot pressing plate 4 again, turning on the hydraulic cylinder 41 to drive the upper hot pressing plate 43 to move down to perform hot pressing on the bamboo wood; with the assistance of microwaves of the microwave element 42, turning off the hydraulic cylinder 41; and completing the preparation of the magnetic bamboo wood.

Figure 10:
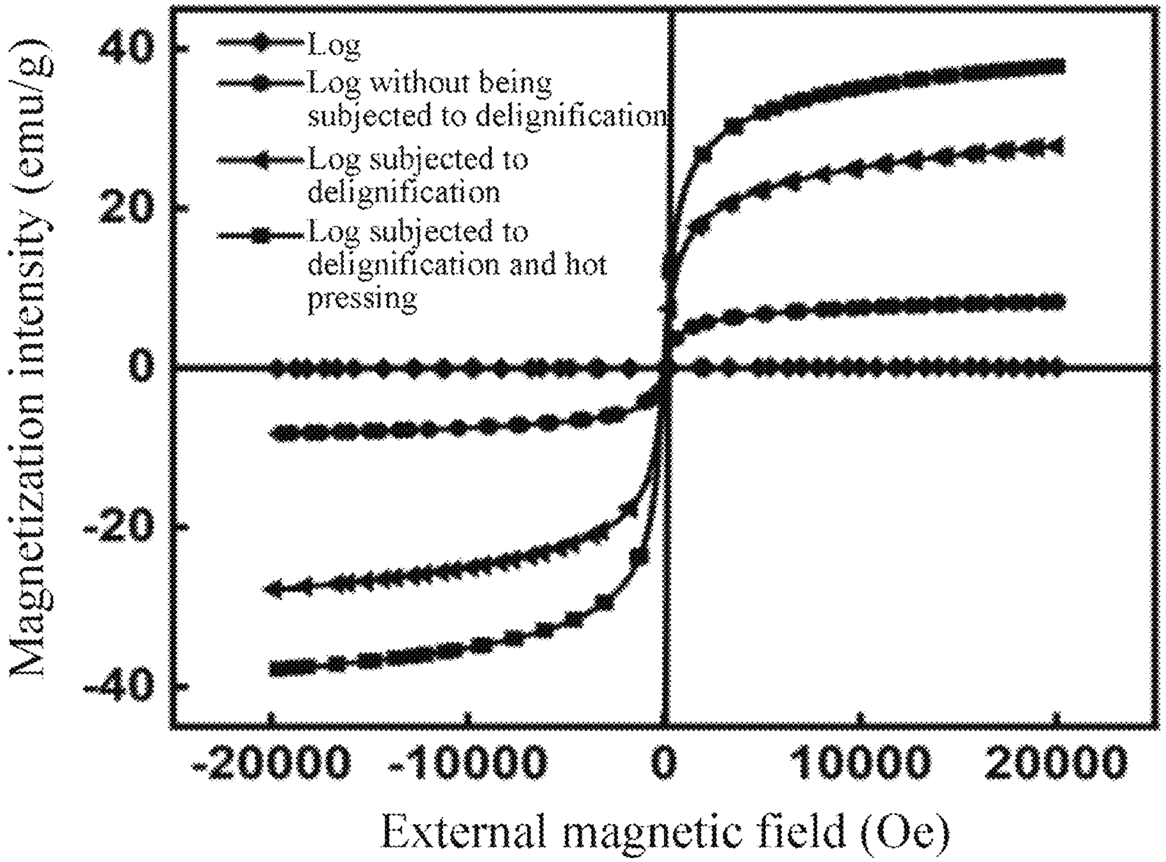
FIG. 10 is a curve diagram of magnetisms of a log according to the present disclosure.

FIG. 10 shows a curve diagram of magnetisms of a log, a log without being subjected to delignification, a log subjected to delignification, and a log subjected to delignification and hot pressing. The initial magnetization intensity of the log is 0. As an external magnetic field increases, the magnetization intensity of the log still remains 0. When the lignin in the log is not completely eluted in a mixture of the sodium hydroxide and the sodium sulfite, the magnetization intensity of the log without being subjected to delignification is between −10 and 0. As the external magnetic field increases, the magnetization intensity of the log without being subjected to delignification gradually increases. When the external magnetic field reaches 0, the magnetization intensity of the log without being subjected to delignification will slightly increase. As the external magnetic field increases, the magnetization intensity will eventually reach a range of 0 to 5. After the lignin in the log is eluted, the magnetization intensity is between −30 and −25. As the external magnetic field increases, the magnetization intensity of the log subjected to delignification finally reaches a range of 20 to 30. The magnetization intensity of the log subjected to delignification and hot pressing is between −40 and −35. As the external magnetic field increases, the magnetization intensity of the log subjected to delignification and hot pressing finally reaches a range of 35 to 40.

Those skilled in the art should understand that the above embodiments do not limit the present disclosure in any form, and any technical solutions obtained through equivalent substitutions or equivalent transformations shall fall within the protection scope of the present disclosure.

What is claimed is:

1. A device for preparing a magnetic bamboo wood, wherein the device comprises a base (1), a soaking bucket (2), and a bracket (3); the base (1) is connected to the soaking bucket (2) and the bracket (3); the device further comprises a lower hot pressing plate (4), high-precision powder weighing equipment (5), a water outlet (6), a water adding assembly (7), a clamping mechanism, an air drying mechanism, a heating mechanism, a hot pressing mechanism, and a driving mechanism; the water outlet (6) is arranged on a lower part of the soaking bucket (2); the bracket (3) is fixedly connected to the lower hot pressing plate (4) configured to place a bamboo wood; the driving mechanism is arranged on the bracket (3); the driving mechanism comprises an electric drive pusher I (8); the clamping mechanism is arranged on a telescopic rod of the electric drive pusher I (8); the clamping mechanism is configured to clamp the bamboo wood on the lower hot pressing plate (4) into the soaking bucket (2); the high-precision powder weighing equipment (5) is mounted on the soaking bucket (2); the high-precision powder weighing equipment (5) is configured to accurately feed chemical reagents into the soaking bucket (2); the water adding assembly (7) is arranged on the base (1); the air drying mechanism and the heating mechanism are arranged in the soaking bucket (2); the hot pressing mechanism is arranged on the bracket (3); a solution is added into the soaking bucket (2) through the water adding assembly (7); by cooperation with the chemical reagents fed through the high-precision powder weighing equipment (5), lignin in the bamboo wood is eluted, and the bamboo wood is soaked; after the bamboo wood is dried by the air drying mechanism and the heating mechanism, the hot pressing mechanism is configured to perform hot pressing on the bamboo wood to increase the density of the bamboo wood; the clamping mechanism comprises a connecting assembly (11), a lifting plate (12), clamping plates (13), springs I (14), wedge blocks I (15), springs II (16), pulling ropes (17), and a rotating motor (18); the telescopic rod of the electric drive pusher I (8) is fixedly connected to the connecting assembly (11); the connecting assembly (11) is slidably connected to the lifting plate (12); one side of the connecting assembly (11) is fixedly connected to the rotating motor (18); the rotating motor (18) is fixedly connected to the lifting plate (12) through a rotating shaft and the connecting assembly (11); the springs II (16) are mounted between the connecting assembly (11) and the lifting plate (12); the clamping plates (13) are slidably connected into the lifting plate (12); the springs I (14) are connected between the lifting plate (12) and the clamping plates (13); the wedge blocks I (15) matched with the clamping plates (13) are arranged in the lifting plate (12); the pulling ropes (17) are connected between the connecting assembly (11) and the wedge blocks I (15); the hot pressing mechanism comprises a hydraulic cylinder (41), a microwave element (42), an upper hot pressing plate (43), and a limiting assembly; the hydraulic cylinder (41) is mounted on the bracket (3); the microwave element (42) is fixedly connected to a piston rod of the hydraulic cylinder (41); the microwave element (42) is fixedly connected to the upper hot pressing plate (43); and the limiting assembly is arranged on the lower hot pressing plate (4) to restrict the movement of the bamboo wood during hot pressing performed on the bamboo wood;

when the device is used for preparing the magnetic bamboo wood, the preparing method comprises the following steps:

S1: pumping distilled water into the soaking bucket (2), and feeding sodium hydroxide and sodium sulfite in a ratio of 2:1 into the soaking bucket (2) in sequence through the high-precision powder weighing equipment (5), obtaining a mixed solution after full dissolving, heating the solution to enable the solution to react with the lignin in the bamboo wood to elute the lignin;

S2: adding hydrogen peroxide, heating the mixture, washing off residual sodium hydroxide and sodium sulfite, and then adding ethyl alcohol to wash the bamboo wood for 1 to 5 hours;

S3: drying the bamboo wood until the moisture content is below 12%;

S4: putting a trivalent ferrite salt and a divalent ferrite salt into the soaking bucket (2), wherein the trivalent ferrite salt and the divalent ferrite salt are dissolved in the soaking bucket (2) with deionized water for full dissolving, so that a molar concentration ratio of trivalent iron to divalent iron in the mixed solution is 2:1, and soaking the bamboo wood;

S5: drying the bamboo wood in air;

S6: pumping a 25% ammonia water into the soaking bucket (2) to soak the bamboo wood in the 25% ammonia water, and drying the bamboo wood in air after the soaking of the bamboo wood ends; and S7: clamping the bamboo wood onto the lower hot pressing plate (4) again, turning on the hydraulic cylinder (41) to drive the upper hot pressing plate (43) to move down to perform hot pressing on the bamboo wood; with the assistance of microwaves of the microwave element (42), turning off the hydraulic cylinder (41); and completing the preparation of the magnetic bamboo wood.

2. The device for preparing the magnetic bamboo wood according to claim 1, wherein the air drying mechanism comprises a fan (21) and an air outlet pipe (22); the fan (21) is mounted on the soaking bucket (2); the fan (21) is connected to the air outlet pipe (22); and the air outlet pipe (22) is communicated to the soaking bucket (2).

3. The device for preparing the magnetic bamboo wood according to claim 1, wherein the heating mechanism comprises a heater (31) and a heating pipe (32); the heater (31) is mounted at the lower part of the soaking bucket (2); the heating pipe (32) is mounted on the heater (31); and the heating pipe (32) is located at an inner lower part of the soaking bucket (2).

4. The device for preparing the magnetic bamboo wood according to claim 1, wherein the limiting assembly comprises limiting plates (44), springs III (45), inclined blocks (46), an electric drive pusher II (47), a wedge block II (48), and lifting blocks (49); the lower hot pressing plate (4) is symmetrically slidably connected to the limiting plates (44); the springs III (45) are connected between the limiting plates (44) and the lower hot pressing plate (4); the upper hot pressing plate (43) is symmetrically fixedly connected to the inclined blocks (46) matched with the limiting plates (44); sliding slots are symmetrically formed in one side of the lower hot pressing plate (4); the lifting blocks (49) are slidably connected into the sliding slots; top ends of the lifting blocks (49) are fixedly connected to the electric drive pusher II (47) and the wedge block II (48); elastic members are arranged at bottom ends of the lifting blocks (49); and the elastic members are fixedly connected to a bottom end of the lower hot pressing plate (4) through a supporting plate.

5. The device for preparing the magnetic bamboo wood according to claim 3, further comprising a driving motor (51) and a stirring rod (52), wherein the driving motor (51) is mounted at the lower part of the soaking bucket (2); and the stirring rod (52) is fixedly connected to an output shaft of the driving motor (51).

6. The device for preparing the magnetic bamboo wood according to claim 5, further comprising an ultrasonic cleaning machine (61), a vacuum machine (9), an electric guide rail (10), and a sealing plate (19), wherein the ultrasonic cleaning machine (61) is arranged on the soaking bucket (2); the vacuum machine (9) is mounted on one side of the soaking bucket (2) through an extraction pipe; the vacuum machine (9) is fixedly connected to a top end of the base (1); the electric guide rail (10) is arranged at a top end of the soaking bucket (2); and a top end of the electric guide rail (10) is slidably connected to the sealing plate (19).

7. The device for preparing the magnetic bamboo wood according to claim 6, further comprising a water outlet gate (71), a convex block (72), and a spring IV (73), wherein the water outlet (6) on the soaking bucket (2) is slidably connected to the water outlet gate (71) and the convex block (72); and the spring IV (73) is connected between the water outlet gate (71) and the soaking bucket (2).

* * * * *